United States Patent [19]
Sheppard

[11] 3,914,247
[45] Oct. 21, 1975

[54] 2-(PHENYLHALONIUM)-4,5-DICYANO-2H-IMIDAZOLE YLIDS

[75] Inventor: William Arthur Sheppard, Wilmington, Del.

[73] Assignee: E. I. Du Pont de Nemours & Company, Wilmington, Del.

[22] Filed: Dec. 4, 1973

[21] Appl. No.: 421,597

[52] U.S. Cl. ............... 260/309; 260/141; 252/189; 252/408
[51] Int. Cl.² ........................ C07D 233/90
[58] Field of Search ................... 260/309

[56] References Cited
UNITED STATES PATENTS
3,793,339  2/1974  Webster............................ 260/309

OTHER PUBLICATIONS

J.A.C.S. 95, pp. 2695–2697, (May 3, 1973), Sheppard et al.

Primary Examiner—Sherman D. Winters
Attorney, Agent, or Firm—Anthony P. Mentis

[57] ABSTRACT

Pyrolysis of 2-diazo-4,5-dicyano-2H-imidazole in the presence of certain aryl halides yields 2-(arylhalonium)-4,5-dicyano-2H-imidazole ylids. The ylids are intermediates in the preparation of 1-aryl-2-halo-4,5-dicyanoimidazoles.

4 Claims, No Drawings

2-(PHENYLHALONIUM)-4,5-DICYANO-2H-IMIDAZOLE YLIDS

BACKGROUND OF THE INVENTION

1. Field of the Invention

This invention relates to 2-(arylhalonium)-4,5-dicyano-2H-imidazole ylids and to the process of making them by pyrolysis of 2-diazo-4,5-dicyano-2H-imidazole in the presence of certain aryl halides.

2. Prior Art

2-Diazo-4,5-dicyano-2H-imidazole is described by Sheppard and Webster [J. Am. Chem. Soc. 95, 2695 (1973)]. Phenyliodonium methylene ylids are known [Karele and Neiland, J. Org. Chem. USSR 4, 1755 (1968); Hayasi et al., Bull. Chem. Soc. Jap. 43, 2506 (1970)]. A bromonium ylid has been suggested as an intermediate in the reaction of 2,5-di-tert-butylbenzene-1,4-diazooxide with 2,6-diisopropyl-4-bromophenol [Pirkle and Koser, J. Am. Chem. Soc. 90, 3598 (1968)].

SUMMARY OF THE INVENTION

The 2-(arylhalonium)-4,5-dicyano-2H-imidazole ylids of the invention have the formula

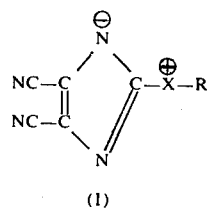

(I)

wherein X is chlorine, bromine or iodine, and

R is aryl of 6–10 carbon atoms, any substituents on R being selected from the group consisting of bromine, chlorine, fluorine and iodine, and alkyl of 1–4 carbon atoms.

The process of the invention involves pyrolysis of 2-diazo-4,5-dicyano-2H-imidazole (II) below in the presence of an aryl halide having the formula RX, where X and R have the foregoing values.

The reaction underlying the process can be illustrated as follows:

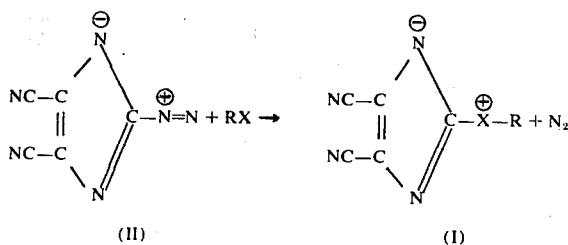

The 2-(arylhalonium)-4,5-dicyano-2H-imidazole ylids (I) undergo rearrangement on heating with formation of 1-aryl-2-halo-4,5-dicyanoimidazoles (III). This reaction can be illustrated as follows:

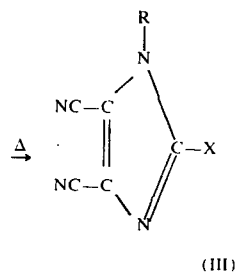

(III)

When the reaction of II and RX is prolonged or carried out at higher temperature, I is generally converted entirely to III.

Representative RX coreactants are chlorobenzene, bromobenzene, iodobenzene, p-chlorotoluene, 1-fluoro-3-iodobenzene, 1-chloronaphthalene, 2-bromonaphthalene, 7-bromo-1-methylnaphthalene, 1-chloro-2-fluoronaphthalene and 2-chloro-1,6-dimethylnaphthalene.

In the process of the invention the 2-diazo-4,5-dicyano-2H-imidazole must be at least partly soluble, i.e., in the liquid phase, at the temperature of the reaction. The RX coreactant can itself be the reaction medium, or a normally liquid organic solvent which is relatively non-reactive with the diazo compound can be used as the reaction medium. Suitable organic solvents include acetonitrile, dimethylformamide, dimethylacetamide and dimethyl sulfone. It is preferred to use the RX coreactant as the reaction medium.

The reaction can be carried out in the temperature range of about 0° to about 100°., the range of 80° to 100°C being preferred.

The process can be carried out over a time schedule of from about one to about 24 hours, the appropriate specific time being generally dependent upon the temperature of reaction. The reaction time is generally shorter at higher temperatures since the rate of reaction increases as the temperature increases.

The process can be carried out at any pressure which provides liquid phase conditions for the reactants, the pressure usually and preferably being atmospheric pressure. However, commensurate with liquid phase conditions, any pressure below or above atmospheric pressure may be used if desired, a practical range being 0.01 to 5000 atmospheres.

SPECIFIC EMBODIMENTS OF THE INVENTION

The following examples illustrate the invention and describe typical products obtained. Temperatures are given in degrees centigrade and the reactions are conducted at atmospheric pressure. Reduced pressures, where indicated, are given in terms of millimeters of mercury. All parts and percentages are by weight unless otherwise stated.

EXAMPLE 1

2-(Phenylchloronium)-4,5-dicyano-2H-imidazole ylid

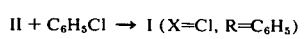

(1)

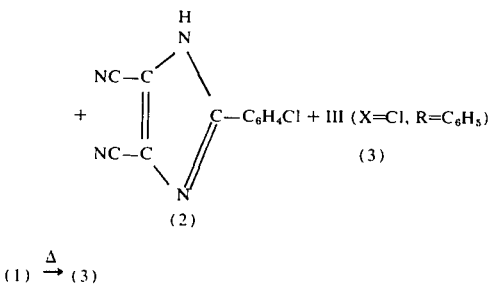

$(1) \xrightarrow{\Delta} (3)$

A. Three separate mixtures each of 5.2 g (36.1 mmol) of 2-diazo-4,5-dicyano-2H-imidazole and 250 ml of chlorobenzene were heated at 85°–88° for 1 hr. The combined effluent gases totaled 2.9 l The reaction mixtures were combined and diluted with 6 of petroleum ether, and the solution was cooled to −20°C. The solid which precipitated was collected on a filter and then dissolved in dichloromethane. This solution was washed with aqueous sodium bicarbonate and the wash acidified and extracted with ethyl acetate to give 8.60 g (35% yield) of 2-(chlorophenyl)-4,5-dicyanoimidazole (2). The dichloromethane layer was diluted with petroleum ether at room temperature, which caused 4.45 g (18% yield) of 2-(phenylchloronium)-4,5-dicyano-2H-imidazole ylid (1) to precipitate. An analytical sample was recrystallized from chloroform-petroleum ether; m.p. 120°–121°C UV $\lambda_{mas}$ 247 nm ($\epsilon$14,000), 285 (3200).

Anal. Calc. for $C_{11}H_5N_4Cl$: : C, 57.8; H, 2.2; N, 24.5; Cl, 15.5 Found: C, 57.8; H, 2.2; N, 24.7; Cl, 16.2.

B. In a similar single run at 80°C. for 1.75 hours, II and excess chlorobenzene yielded 26% of (1), 50% of (2) and 21% of (3).

C. when the ylid (1) was refluxed in chloroform overnight, about 50% of it was rearranged to 2-chloro-1-phenyl-4,5-dicyanoimidazole (3).

EXAMPLE 2

2-(Phenylbromonium)-4,5-dicyano-2H-imidazole ylid

Reaction of bromobenzene with 2-diazodicyanoimidazole (II) under conditions similar to those of Ex. 1 gave 2-(phenylbromonium)-4,5-dicyano-2H-imidazole ylid (I: X=Br, R=C₆H₅) in 40% yield; m.p. 143°–144° from chloroform; UV $\lambda_{max}$ 250nm ($\epsilon$14,800), 300 (2940).

Anal. Calc. for $C_{11}H_5N_4Br$: C, 48.4; H, 1.9; N, 20.5; Br, 29.3 Found: C, 48.2; H, 2.0; N, 20.3; Br, 28.6 In this run there was also obtained 4% of 2-bromo-1-phenyl-4,5-dicyanoimidazole (III: X=Br, R=C₆H₅) and 47% of 2-bromophenyl-4,5-dicyanoimidazole.

A sample of the bromonium ylid was heated for 3 hours at 80° in bromobenzene, and about 18% of it was rearranged to 2-bromo-1-phenyl-4,5-dicyanoimidazole.

EXAMPLE 3

2-(Phenyliodonium)-4,5-dicyano-2H-imidazole ylid

II + C₆H₅I → I (X=I, R=C₆H₅)

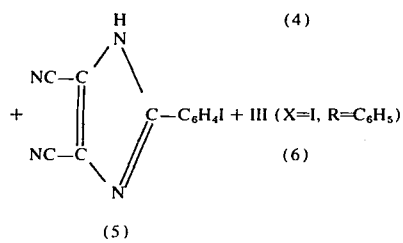

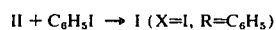
$(4) \rightarrow (6)$

A. 2-Diazo-4,5-dicyano-2H-imidazole (II: 5.5g, 0.38 mole) was heated at 80°C in 70 ml of iodobenzene. After 6 hours, approximately the theoretical yield of gaseous nitrogen (910 ml) was evolved. After refluxing overnight, the solution was filtered hot to give 10.9 g of a yellow powder that was recrystallized from acetonitrile. This product mp 221°–222°C., was characterized as the iodo ylid (4) by ir, nmr, elemental analysis and mass spectra.

Anal. Calcd for $C_{11}H_5N_4I$: C, 41.3; H, 1.57; N, 17.5; I, 39.7 Found: C, 41.5; H, 1.79; N, 17.2; I, 39.5 41.3 1.72

The filtrate was evaporated to give 1.4 g of crystalline solid, mp about 55°C., that appeared by ir and nmr to be a mixture of 2-(iodophenyl)-4,5-dicyanoimidazole (5) and 1-phenyl-2-iodo-4,5-dicyanoimidazole (6). (5) is believed to be an original coproduct with (4) and (6) to be derived by rearrangement of (4).

B. The iodo ylid [(44), 1g] was mixed with 30 ml of o-dichlorobenzene and the latter heated to boiling for 1.25 hours. The mixture was then filtered hot and the insoluble solid washed with petroleum ether to recover 0.14 g of unchanged ylid, identified by infrared analysis. Addition of more petroleum ether to the filtrate at room temperature precipitated an additional 0.34 g of the ylid starting material. The final filtrate yielded a residue which was recrystallized from hexane to yield about 0.1 g of (6), mp 150°–151°, identified by mass spectral analysis.

Anal. Calcd for $C_{11}H_5N_4I$: C, 41.3; H, 1.57; N, 17.5 Found: C, 41.36; H, 1.76; N, 17.05

EXAMPLE 4

2-(p-Tolylchloronium)-4,5-dicyano-2H-imidazole Ylid

II was reacted with p-chlorotoluene under conditions similar to those of Example 1. Products were isolated through removal of unreacted chlorotoluene by distillation and extraction of the residue with aqueous sodium bicarbonate. The extracted residue yielded 18% of 2-(p-tolylchloronium)-4,5-dicyano-2H-imidazole ylid (I: X = Cl, R = C₆H₄CH₃, mp 160° dec.) and 6.3% of 2-chloro-1(p-tolyl)-4,5-dicyano-imidazole (III: X = Cl, R = C₆H₄CH₃). The sodium bicarbonate extract yielded 40% of 2-(2-chloro-4-methylphenyl)-4,5-dicyanoimidazole.

Anal. (ylid) Calcd for $C_{12}H_7ClN_4$: C, 59.39; H, 2.91; N, 23.09 Found C, 59.71; H, 2.88; N, 23.24.

EXAMPLE 5

2-(m-Fluorophenyliodonium)-4,5-dicyano-2H-imidazole Ylid

Reaction of 1-fluoro-3-iodobenzene with II by the procedure of Example 4 yielded 41.8% of 2-(m-fluorophenyl-iodonium)-4,5-dicyano-2H-imidazole ylid (I: X = I, R = C₆H₄F, mp 140° dec.), 4% of 2-iodo-1-(m-fluorophenyl)-4,5-dicyanoimidazole (III: X = I, R = C₆H₄F), and 29.6% of base soluble 2-(2-fluoro-4-iodophenyl)-4,5-dicyanoimidazole.

Anal. (ylid) Calcd for $C_{11}H_4FIN_4$: C, 39.08; H, 1.19; N, 16.57 Found: C, 39.31; H, 1.34; N, 15.99.

The novel 2-(arylhalonium)-4,5-dicyano-2H-imidazole ylids are useful as intermediates to 1-aryl-2-halo-4,5-dicyanoimidazoles. The 1-aryl-2-halo-4,5-dicyanoimidazoles are generally useful as agents for removing halogen acids, e.g., hydrogen chloride, from organic solutions where distillation or neutralization procedures are not desirable. They can be used to analyze for halogen acids in orangic solvents, by adding an excess of the imidazole to a sample of the solution followed by filtering, collecting, drying and weighing the insoluble imidazole derivative which remains on the filter. They can also be used as buffers in organic aprotic solvents to maintain a constant proton level.

I claim:
1. A compound of the formula

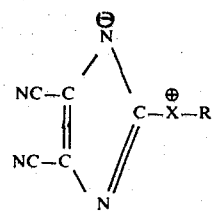

wherein X is chlorine, bromine or iodine and R is phenyl or naphthyl, any substituent on R being selected from the group consisting of bromine, chlorine, fluorine and iodine, and alkyl of 1–4 carbon atoms.

2. A compound of claim 1 where X is chlorine and R is phenyl.

3. A compound of Claim 1 where X is bromine and R is phenyl.

4. A compound of claim 1 where X is iodine and R is phenyl.

* * * * *